United States Patent
Maguire, Jr.

(10) Patent No.: US 9,274,596 B2
(45) Date of Patent: Mar. 1, 2016

(54) MOVEABLE HEADREST FOR VIEWING IMAGES FROM DIFFERENT DIRECTIONS

(75) Inventor: Francis J. Maguire, Jr., Southbury, CT (US)

(73) Assignee: Susan C. Maguire, Southbury, CT (US)

(*) Notice: Subject to any disclaimer, the term of this patent is extended or adjusted under 35 U.S.C. 154(b) by 2043 days.

(21) Appl. No.: 12/273,482

(22) Filed: Nov. 18, 2008

(65) Prior Publication Data
US 2009/0127899 A1    May 21, 2009

Related U.S. Application Data

(63) Continuation of application No. 09/524,491, filed on Mar. 13, 2000, now Pat. No. 7,453,451.

(60) Provisional application No. 60/124,642, filed on Mar. 16, 1999.

(51) Int. Cl.
G09G 5/00    (2006.01)
G06F 3/01    (2006.01)

(52) U.S. Cl.
CPC ............. *G06F 3/012* (2013.01); *G06F 3/011* (2013.01); *G06F 3/013* (2013.01); *G06F 3/016* (2013.01)

(58) Field of Classification Search
USPC ........................................ 345/7–9, 32, 205
See application file for complete search history.

(56) References Cited

U.S. PATENT DOCUMENTS

| | | |
|---|---|---|
| 3,965,402 A | 6/1976 | Mogle |
| 4,261,635 A | 4/1981 | Freeman |
| 4,299,576 A | 11/1981 | Kron |
| 4,984,179 A | 1/1991 | Waldern |
| 5,203,609 A | 4/1993 | Stoeckl |
| 5,252,070 A | 10/1993 | Jarrett |
| 5,267,708 A | 12/1993 | Monson et al. |
| 5,319,490 A | 6/1994 | Ansley |
| 5,320,534 A | 6/1994 | Thomas |
| 5,388,990 A | 2/1995 | Beckman |
| 5,436,638 A | 7/1995 | Bolas et al. |
| 5,441,331 A | 8/1995 | Vento |
| 5,615,132 A | 3/1997 | Horton et al. |
| 5,642,302 A | 6/1997 | Dumont et al. |
| 5,644,324 A | 7/1997 | Maguire, Jr. |
| 5,671,037 A | 9/1997 | Ogasawara et al. |
| 5,673,059 A | 9/1997 | Zavracky et al. |
| 5,695,406 A * | 12/1997 | Park .............................. 472/61 |
| 5,729,475 A | 3/1998 | Romanik, Jr. |
| 5,734,421 A | 3/1998 | Maguire, Jr. |
| 5,751,259 A | 5/1998 | Iwamoto |
| 5,791,735 A * | 8/1998 | Helman ........................ 297/407 |
| 5,792,031 A | 8/1998 | Alton |
| 5,835,224 A | 11/1998 | Hercher |
| 5,857,986 A | 1/1999 | Moriyasu |
| 5,908,300 A | 6/1999 | Walker et al. |
| 5,977,935 A | 11/1999 | Yasukawa et al. |

(Continued)

*Primary Examiner* — William Boddie
*Assistant Examiner* — Leonid Shapiro

(57) ABSTRACT

A moveable headrest is mounted on or with respect to a support for supporting a user in viewing images in a standing, seated, or reclining posture. The headrest is for supporting the head of the user in executing head movements with a changing direction-of-view. A display mounted with respect to the user's head provides the images. An actuator can be provided for moving the moveable headrest for a passive user. A sensor can be provided for sensing movements of the moveable headrest, i.e., for sensing the movements from a changing direction. The moveable headrest apparatus may include either or both the actuator and the sensor.

3 Claims, 8 Drawing Sheets

(56) References Cited

U.S. PATENT DOCUMENTS

| | | |
|---|---|---|
| 6,011,526 A | 1/2000 | Toyoshima et al. |
| 6,056,362 A | 5/2000 | de la Haye |
| 6,057,810 A | 5/2000 | Roell et al. |
| 6,201,568 B1 | 3/2001 | Watkins |
| 6,234,446 B1 | 5/2001 | Patterson |
| 6,242,701 B1 | 6/2001 | Breed et al. |
| 6,259,565 B1 | 7/2001 | Kawamura et al. |
| 6,396,497 B1 * | 5/2002 | Reichlen ................. 345/427 |

* cited by examiner

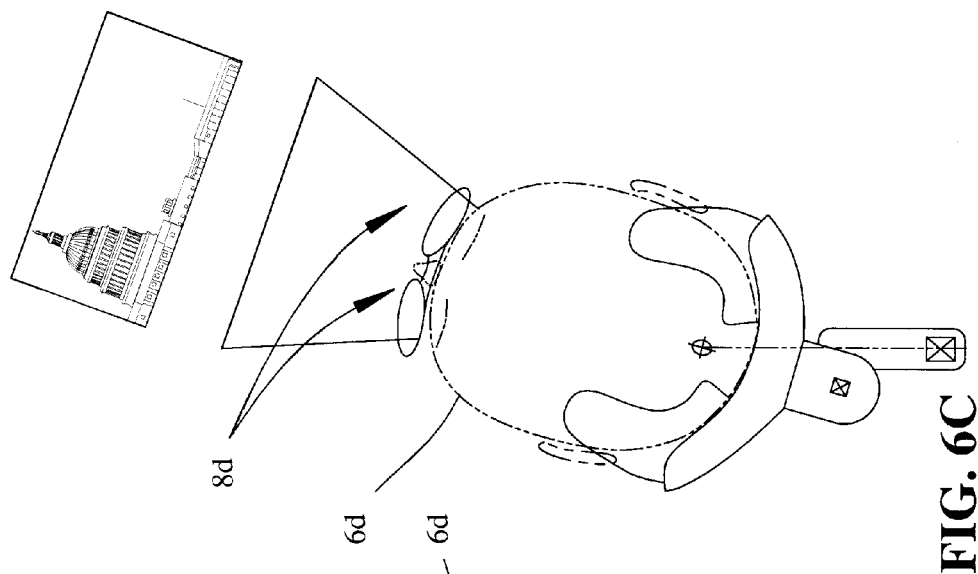
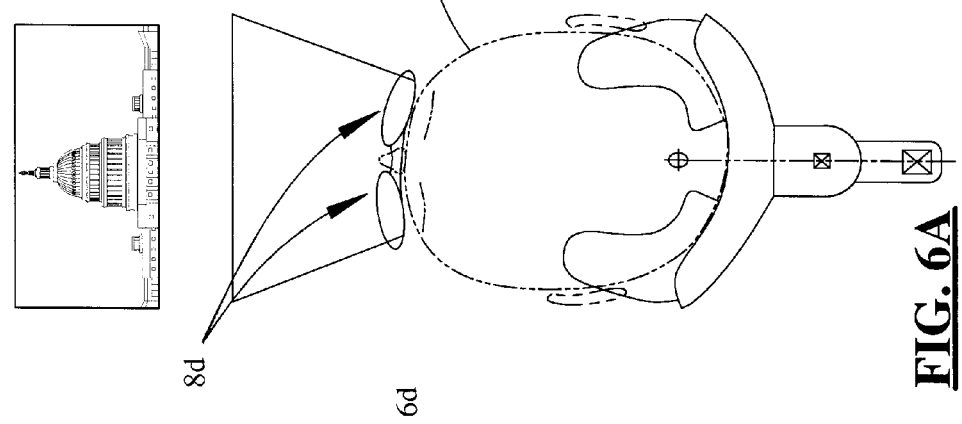
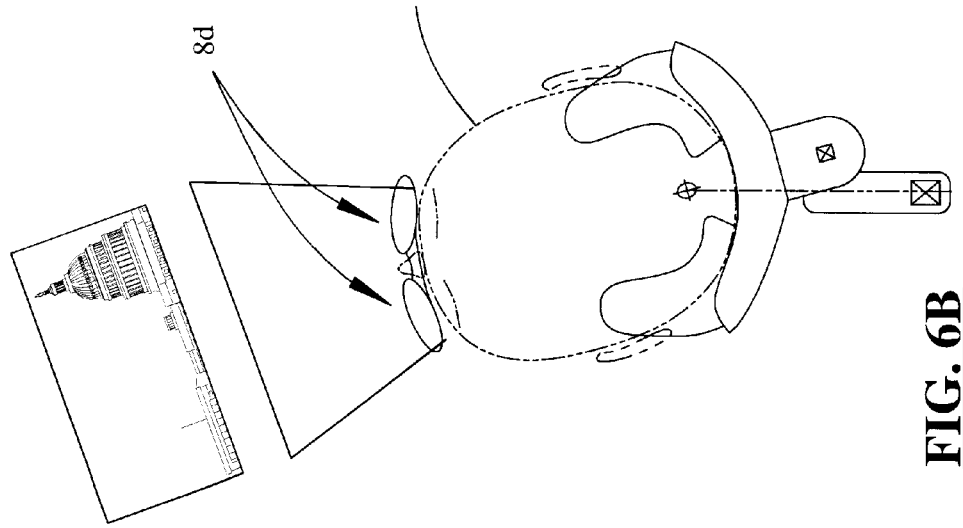

MOVEABLE HEADREST FOR VIEWING IMAGES FROM DIFFERENT DIRECTIONS

CROSS-REFERENCE TO RELATED APPLICATION

This patent application is a continuation of U.S. Regular patent application Ser. No. 09/524,491 filed Mar. 13, 2000 now U.S. Pat. No. 7,453,451 based on U.S. Provisional Application Ser. No. 60/124,642 filed Mar. 16, 1999 from both of which priority is claimed under 35 U.S.C. 119 and 120.

BACKGROUND OF THE INVENTION

1. Technical Field

The present invention relates to imaging systems and, more particularly, to imaging systems in which a changing direction-of-view of the images is coupled to a changing direction-of-view of the head of the viewer.

2. Description of Related Art

Certain imaging systems provide the user with a light stimulus in the form of images (or for forming images) and provide other sensory stimuli as well to immerse the user in an artificial world that seems real. In active systems, movements of the user are sensed and used as inputs to a "virtual reality" engine that selects and provides the images and other sensory stimuli according to the sensed movements. In particular, the position and attitude of the head of the viewer can be monitored in three-dimensional space by several different methods. By "position" of the head is meant the translations in a three-dimensional space of the monitored head or of an arbitrary point associated therewith. By "attitude" of the head is meant the direction or direction-of-view of the monitored head or the arbitrary point. Its meaning is analogous to "attitude" in an aircraft, i.e., pitch, roll and yaw. Among these monitoring methods are: (a) the method and apparatus shown in U.S. Pat. No. 5,615,132 for determining position and orientation of a moveable object using accelerometers, (b) the image display method and apparatus with means for yoking viewpoint orienting muscles of a user shown in U.S. Pat. No. 5,436,638, and (c) optical methods such as shown in U.S. Pat. No. 5,835,224 or U.S. Pat. No. 5,729,475. Sensed signals indicative of the position and attitude of the head are input to the reality engine which then generates images having a positional point-of-view as well as a direction-of-view that changes in correspondence with changes in the position and direction-of-view of the head of the user. In passive systems, such as shown in U.S. Pat. No. 5,734,421, the head of a passive user is guided in plural degrees of freedom by an actuator to view an artificial world from various positions and directions-of-view. However, these various approaches suffer from a twofold problem. First, the known active and passive systems require the user to address the imaging system with an erect standing or seated posture that can be physically wearying over extended periods. Second, in the context of active applications, such as entertainment, they require the user to exert a degree of activism that can be overly demanding and even disconcerting. Such requirements are the antithesis of the relaxed entertainment experience preferred by most users.

DISCLOSURE OF INVENTION

An object of the present invention is to provide an immersive imaging system that can be enjoyed passively or semi-actively, in a relaxed way, without requiring any overly demanding or disconcerting activism.

Another object of the invention is to provide an immersive imaging system without requiring a posture that wearies the user.

According to the present invention, an apparatus comprises a support for supporting a user in viewing images in a standing, seated, or reclining posture, and a moveable headrest mounted on or with respect to the support for supporting a head of the user in executing head movements with a changing direction.

In further accord with the present invention, the apparatus further comprises a display mounted on the head or on the moveable headrest for providing the images for the viewing from the changing direction.

In still further accord with the present invention, the apparatus further comprises an actuator for moving the moveable headrest. Or, the apparatus further comprises a sensor for sensing movements of the moveable headrest, i.e., for sensing the movements from a changing direction. The apparatus may include both the actuator and the sensor.

These and other objects, features and advantages of the present invention will become more apparent in light of the detailed description of a best mode embodiment thereof as illustrated in the accompanying drawing.

BRIEF DESCRIPTION OF THE DRAWING

FIG. 6A shows the head of the user of FIG. 5 from above as the user views a scene with a straight-ahead direction-of-view.

FIG. 6B shows the head of the user of FIG. 5 from above as the user views a scene with a leftward direction-of-view.

FIG. 6C shows the head of the user of FIG. 5 from above as the user views a scene with a rightward direction-of-view.

DETAILED DESCRIPTION OF PREFERRED EMBODIMENTS

Figure 1:
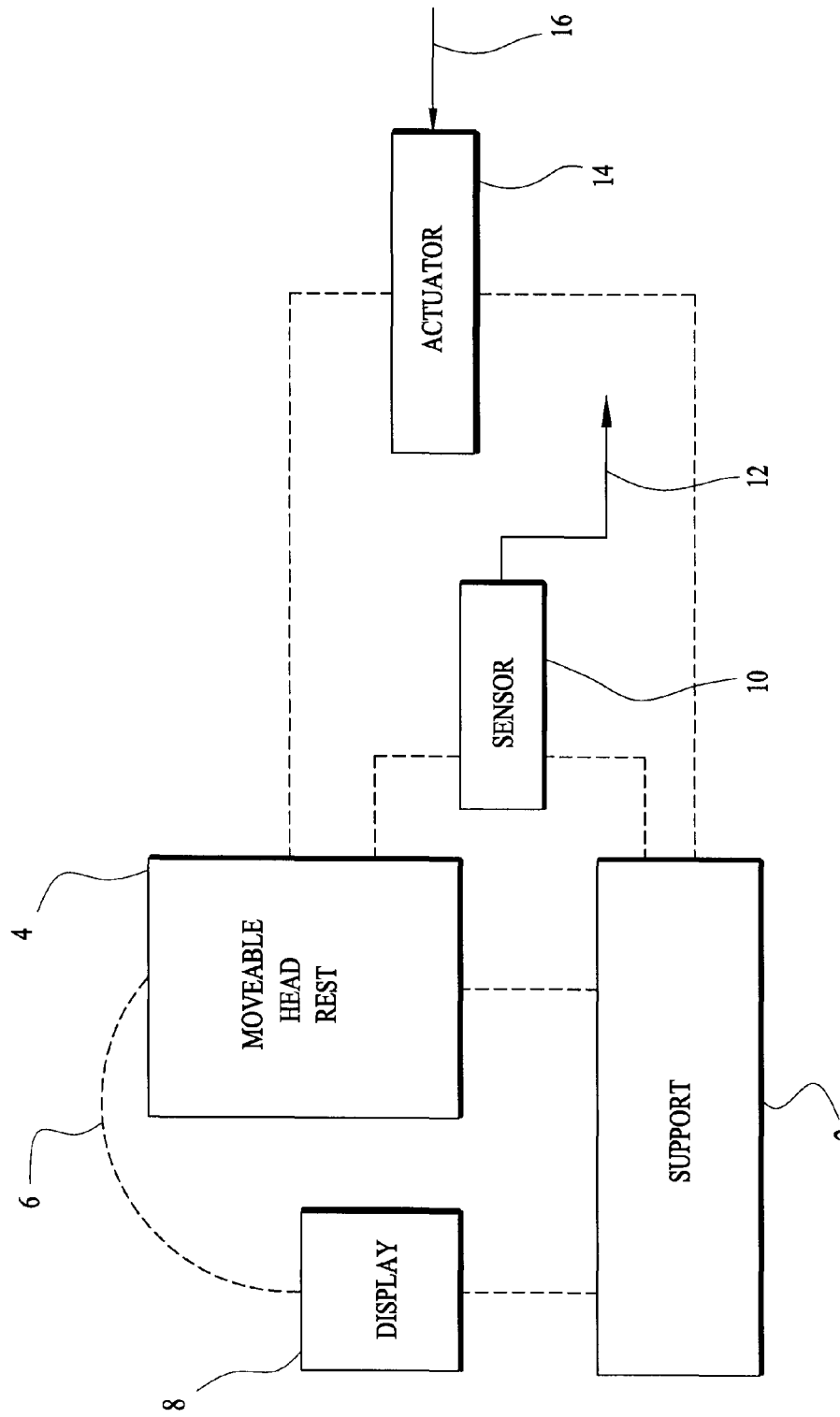
FIG. 1 shows a moveable headrest for supporting the head of a user in executing head movements while viewing images from a changing direction, according to the invention.

FIG. 1 shows a support 2 for supporting the body of a user and more particularly for supporting a moveable headrest 4 for supporting the back of the head 6 of the user in executing head movements while viewing images provided by a display 8 from a changing direction, i.e., a changing "direction-of-view," according to the invention. In other words, the direction, i.e., attitude of the head of the viewer actively changes or is passively changed for viewing images from a correspondingly changing direction. In the case where the moveable headrest is moveable by the user actively changing the direction of his head, i.e., under his own volition, the movements are monitored by a sensor 10 for the purpose of providing an input signal on a line 12 to a reality engine (see FIGS. 9 and 10) for selecting the images according to the changing direction. In the case where the attitude of the head of the user is passively changed, the moveable headrest is moveable by an actuator 14 to change the "direction-of-view" of the head of the user in response to a command signal on a line 16 from a reality engine (see FIGS. 11 and 12) with the images changing their direction-of-view correspondingly, according to an image signal from the reality engine. Although the display 8 is shown adjacent the head 6, it should be realized that it can be apart from the head.

Figure 2:
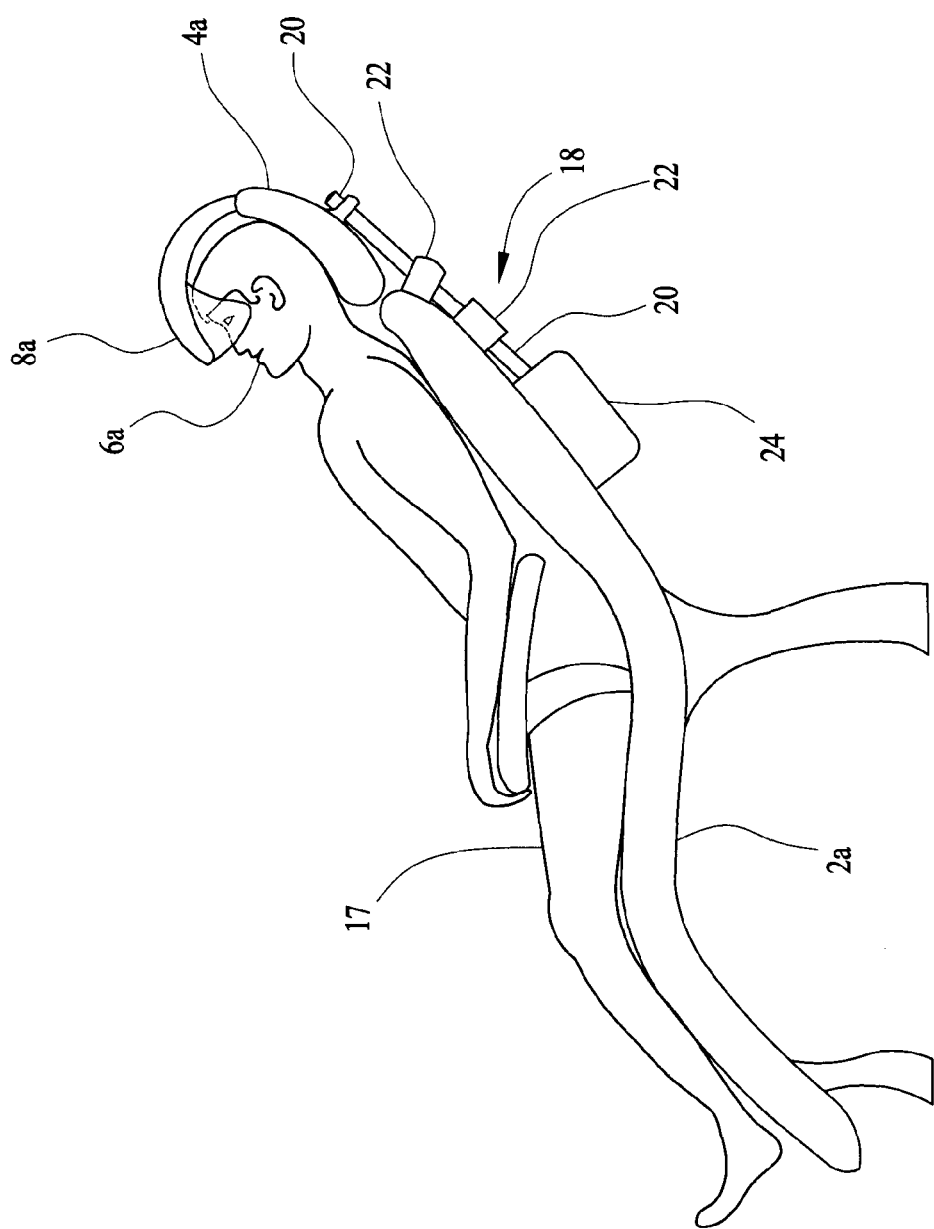
FIG. 2 shows a user reclining on a support in the form of a recliner equipped with a moveable headrest while viewing images from a changing direction, according to the invention.

FIG. 2 shows a user 17 reclining on a support in the form of a recliner 2a equipped with a moveable headrest 4a with a rod 20 supported by a support 18 that is attached to or part of the support 2a. The support 18 may comprise brackets 22 through which the rod 20 is threaded. The rod may come to rest or be fixedly terminated on a stop 24. The head 6a of the user in a reclining position rests on the headrest 4a for viewing images from a changing direction-of-view provided by a display 8a which may be any kind of a display. One of the many types of display that may be used is a head mounted display such as shown in U.S. Pat. No. 5,671,037. Although the recliner 2a is shown as a stationary support, it can be of the type shown in U.S. Pat. No. 5,695,406. It should be realized that although the moveable headrest is shown supported by a support 2 which may also support the body of the user, the body of the user need not be supported by the support 2 but may be supported in some other way. In other words, the moveable headrest may equivalently be supported by a support that is different from the support provided for supporting the body of the user. For instance, the headrest might be wall-mounted and the user support positioned nearby to allow the head of the supported user to rest on the headrest in the same way as shown above.

Figure 3:
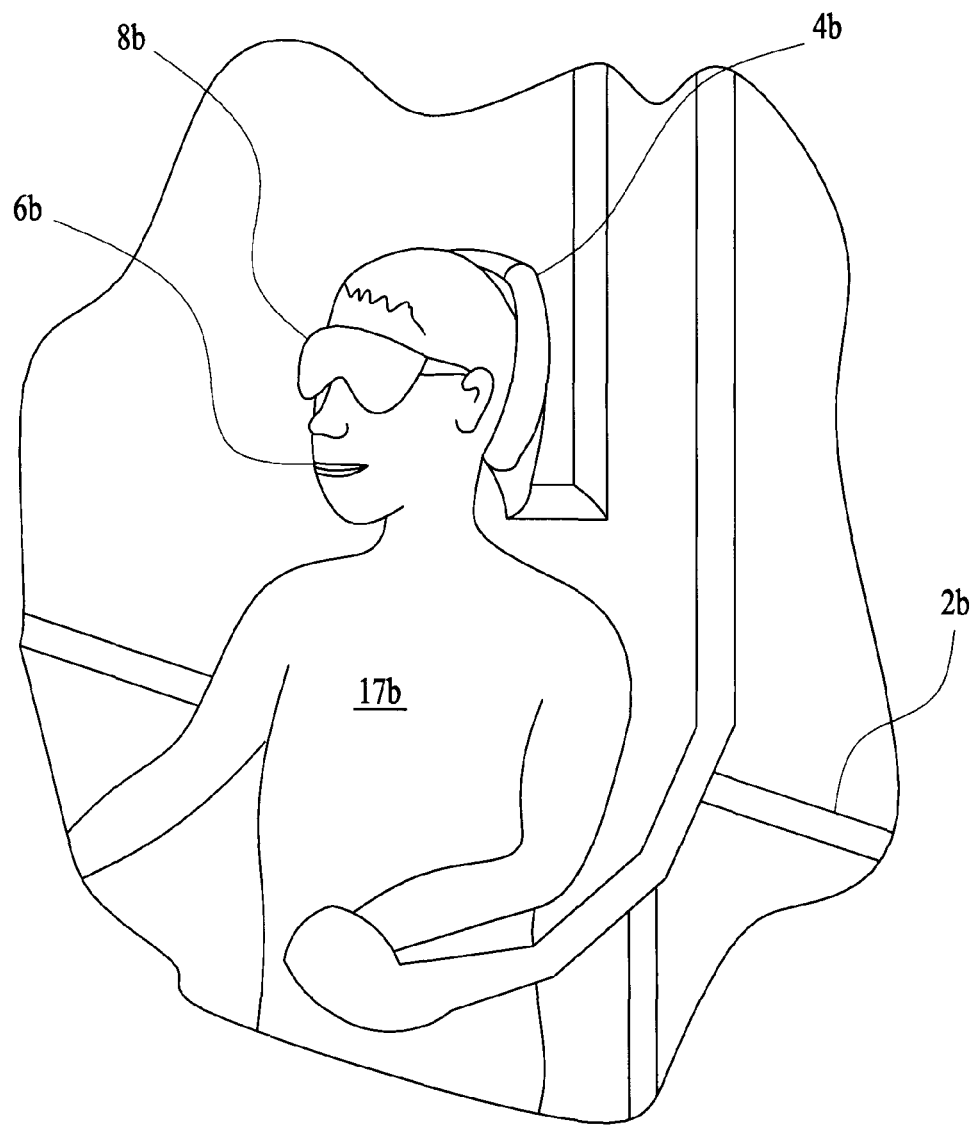
FIG. 3 shows a user standing on a support in the form of a human activity simulator equipped with a moveable headrest while viewing images from a changing direction, according to the invention.

For another instance, FIG. 3 shows a user 17b secured in a standing position on a support 2b in the form of a human activity simulator such as shown in U.S. Pat. No. 5,792,031. The simulator is equipped, according to the present invention, with a moveable headrest 4b for supporting the head of the user while viewing images provided by a display 8b from a changing direction.

Figure 4:
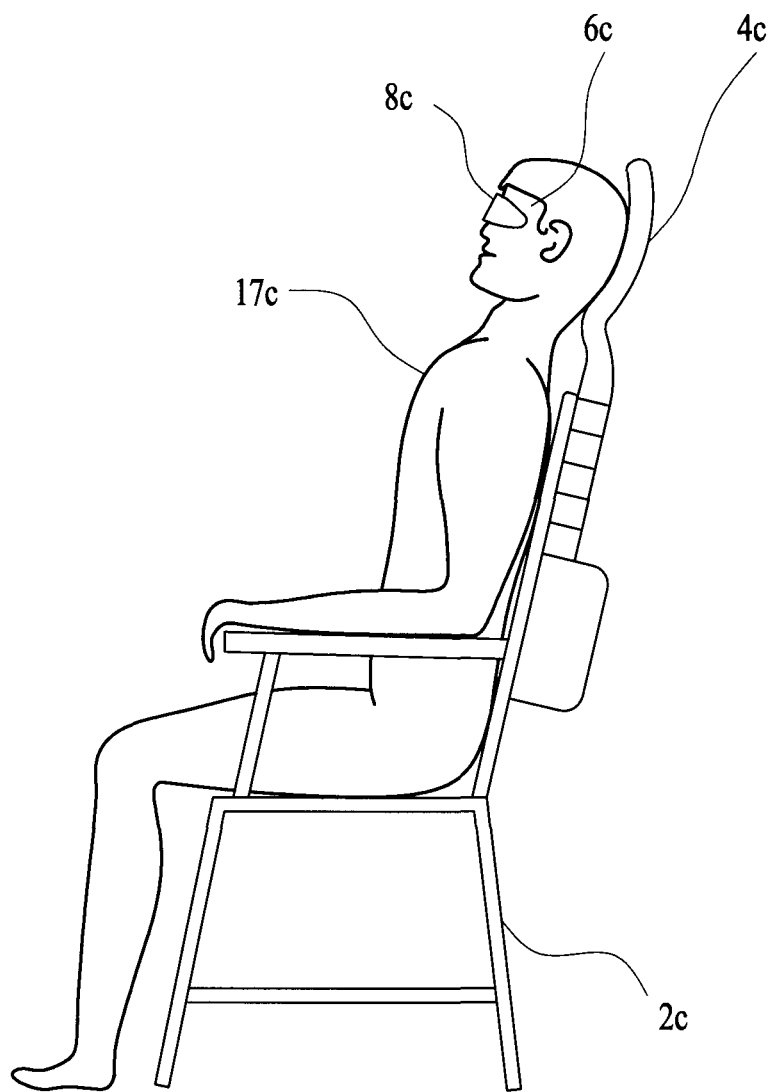
FIG. 4 shows a user seated on a support in the form of a chair equipped with a moveable headrest while viewing images from a changing direction, according to the invention.

In yet another instance, FIG. 4 shows a user 17c seated on a support in the form of a chair 2c equipped with a moveable headrest 4c while viewing images provided by a display 8c from a changing direction, according to the invention. Although the chair 2c is shown as a stationary support, it can be of the type shown in U.S. Pat. No. 5,642,302, modified appropriately to be continuously positionable, as in the recliner of U.S. Pat. No. 5,695,406.

Figure 5:
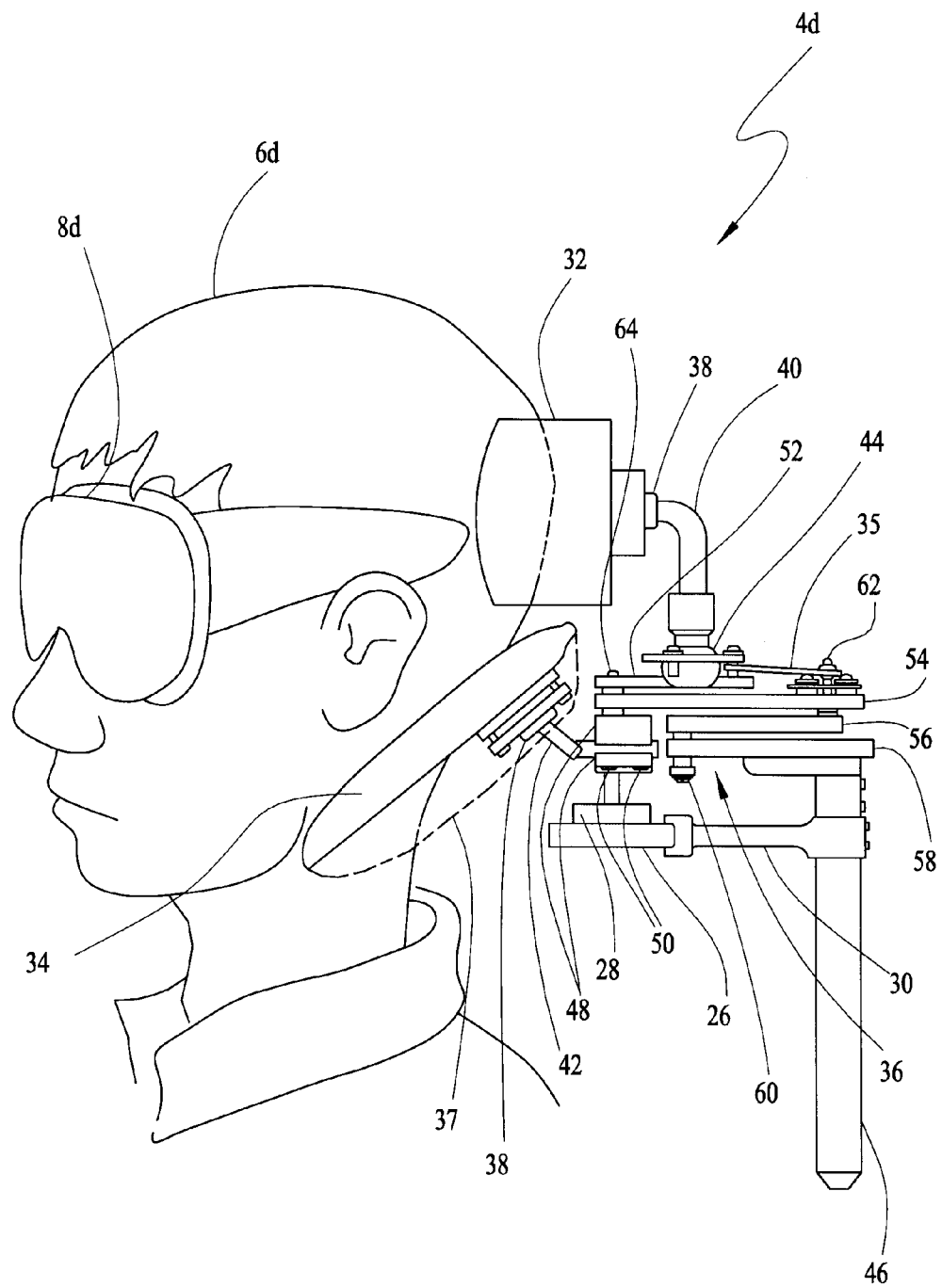
FIG. 5 shows a moveable headrest with a pivotal support assembly for supporting the head of a user in executing head movements while viewing images from a changing direction.

FIG. 5 shows a moveable headrest 4d with a pivotal support assembly for supporting the head 6d of a user in executing head movements with a changing direction-of-view while viewing images from a correspondingly changing direction-of-view. Except for the display 8d, an actuator 26, a sensor 28 and a supporting bracket 30, the hardware for the headrest structure shown in FIG. 5 and described below is taken from U.S. Pat. No. 5,791,735 of Helman entitled "Headrest assembly with user actuated pivotal support assembly." The Helman headrest is for attachment to a wheelchair seating system for use in supporting and assisting with movements of the head of a patient with weak neck muscles. It includes a cushioned backpad 32, a pair of laterally spaced apart cushioned side pads 34, and a mounting assembly 36 located substantially to the rear of the headrest. The mounting assembly 36 enables the backpad and the sidepads to rotate together as a unit about a vertical axis located forward of the mounting assembly. The mounting assembly is formed such that the vertical axis of rotation of the assembly substantially coincides with the spinal column of the human patient seated in the wheelchair. The rotational range of backpad 32 and sidepads 34 is manually adjustable and limited to a prescribed range. A force is formed with a rubber band 35 resisting rotational displacement in the backpad 32 and sidepads 34 returning the headrest to a null, forward facing orientation. The strength of the force increases with a corresponding increase in rotational displacement of the headrest. For the purposes of the present invention, the headrest assembly can be used to support the head of a user while viewing images from a controlled location.

To enable cushions 32, 34 to be positioned so that they best fit the particular user's head 6d, pivoting assemblies 38 connect the support cushions 32, 34 to structural members 40, 42, respectively. The pivoting assemblies 38 are composed off a ball and socket type joint which allows pivoting of cushions 32, 34. This pivoting action allows cushions 32, 34 to be tilted and oriented such that they best firmly contact the head of the particular user supported as shown e.g. in FIGS. 2-4, thus accommodating different shapes and sizes of heads of different users. It should be realized that the left sidepad 34 is shown unpivoted in FIG. 5 in order to show the pivoting assembly. With a human head resting against the sidepad 34 it will be tilted downward to engage the bottom of the skull of the head 6d as suggested by the dashed line 37. An additional pivoting assembly 44 connects extension member 40 to the mounting assembly 36. The mounting assembly 36 extends rearwardly of the backpad 32 and the sidepads 34 to a support mounting structure 46. Pivoting assembly 44 is composed of a ball and a socket type joint. Pivoting assembly 44 permits cushion 32 to be moved in a back and forth direction thus enabling even greater flexibility in positioning cushion 32 to the particular shape of the user's head. Side cushions 34 may also be adjusted in a back and forth direction since structural members 42 are received in a vice type bracket 48 which holds structural members 42 in place. Bolts 50 in brackets 48 can be loosened such that structural members 18 can be slid the slightly forward and backward, thus giving another dimension of movement in positioning cushions 34. After adjusting structural members 42 to the particular head shape of the user, bolts 50 are tightened in place fixing the side cushions 34 in position. Operating together, cushions 32 and 34 provide comfortable support to the rear and sides on the user's head. Balancing for the user's head is also provided by these supporting cushions.

The side cushions provide points of contact between the user's head and the headrest, and the side and rear cushions provide the only such points of contact.

The Helman headrest assembly provides support and balancing to the user's head not only when it is stationary, but also through limited degrees of motion. To accomplish this, the supporting cushions 32, 34 must be able to move with the rotation of the head. The mechanism to accomplish this function is found in the design of mounting assembly 36 which guides the motion of the cushions 32, 34. Mounting assembly 36 comprises a plurality of four forwardly extending arms 52, 54, 56, 58 which together comprise a linkage assembly. The movement of these forwardly extending arms with respect to one another allows the user to have freedom to rotate his head to a limited degree. The method of functioning of the forwardly extending arms 52, 54, 56 and 58 is explained in more detail in the above-mentioned U.S. Pat. No. 5,791,735 of Helman which is hereby incorporated by reference. Suffice it to say that connectors 60, 62, 64 separate the various forwardly extending arms 52, 54, 56, 58 and enable these arms to pivotally rotate freely about the points through which the respective connector passes.

As mentioned above, the user is equipped with a display 8d, according to the present invention, which provides images from a changing direction-of-view in correspondence with a changing direction-of-view of the head 6d of the user. The user's head is supported and/or guided from the rear and the user can consequently assume a relaxed posture. The display need not be of the goggle type shown in FIG. 5, but may be of any type. FIG. 6A shows the user with his head 6d oriented in a straight-ahead looking direction for viewing a central rotunda part of the US Capital Building in silhouette with a certain field-of-view. In FIG. 6B, the field-of-view has been shifted left for viewing the left-hand side of the U.S. Capital Building. In FIG. 6C, the field-of-view has been shifted right for viewing the right-hand side of the U.S. Capital Building.

Figure 7:
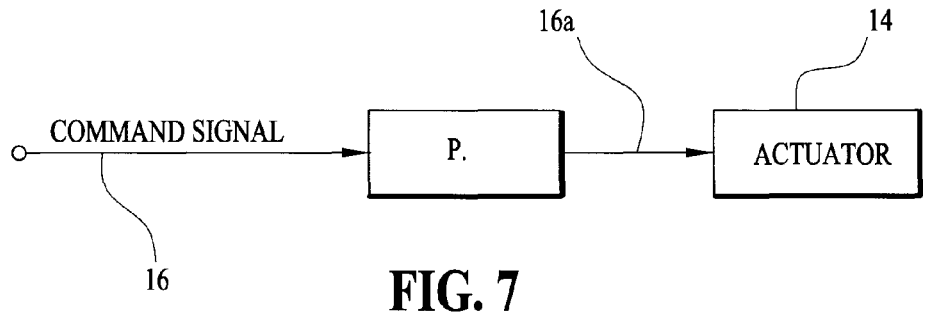
FIG. 7 shows an open-loop proportional control for a moveable headrest used passively.
Figure 8:
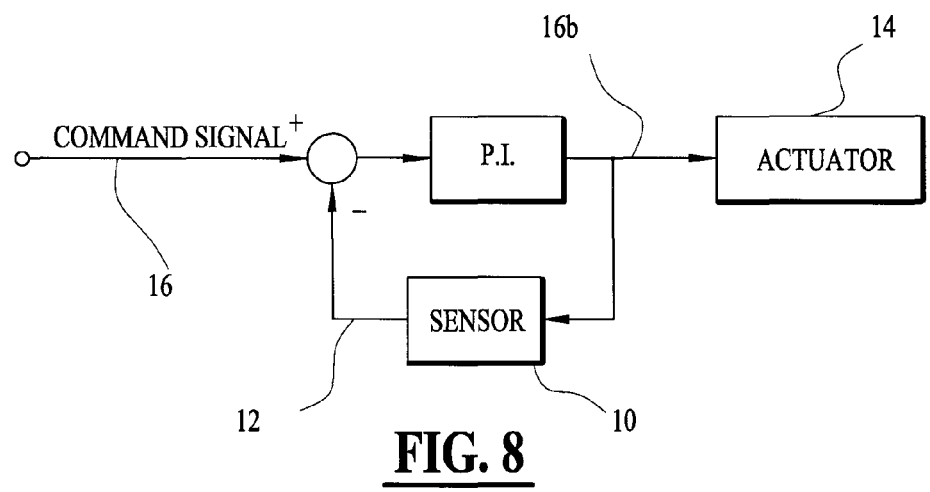
FIG. 8 shows a closed loop proportional-plus-integral control for a moveable headrest used passively.

Depending on the design, the display can be used actively only, passively only, or in a dual mode version either actively or passively. FIG. 5 shows a design in which the headrest assembly of Helman can be used either actively or passively. This is accomplished by providing both a motor 26 and a sensor 28 on the bracket 30 which is rigidly attached to the mounting structure 46. The shaft of the motor and sensor may be axially coupled and fixed to the arm 54 for rotating the arm 54 about the common axis of the motor and sensor. This causes rotations of the other arms 52, 56, 58, which are shown in more detail in U.S. Pat. No. 5,791,735 of Helman. The motor 26 may be a stepping motor, a servo motor, or the like, for use in a passive mode of operation to actuate the headrest assembly in executing headrest movements such as illustrated in FIGS. 6A-6C for guiding the head 6d of the user. In that case, the sensed output signal from the sensor 26 may be unutilized (open loop control) or may be used as a feedback signal (closed loop control). An open loop control is shown in FIG. 7 with the command signal on the line 16 provided to a simple proportional amplifier that in turn provides an amplified output signal on a line 16a to the actuator 14. On the other hand, the sensor 28 may be used in an active mode of operation to sense movements of the headrest assembly such as illustrated in FIGS. 6-8 as actuated by the volitional movements of the user's head 6d. The sensor may be a rotary variable differential transformer (RVDT) or rotary potentiometer, for instance, for sensing angular displacement. A closed loop control is shown in FIG. 8 with the command signal on the line 16 provided to a summing junction where the sensed signal on the line 12 is subtracted therefrom. A difference signal is provided by the summer to a compensator such as proportional-integral (P-I) compensator that in turn provides a compensated output signal on a line 16b to the actuator 14.

Figure 9:
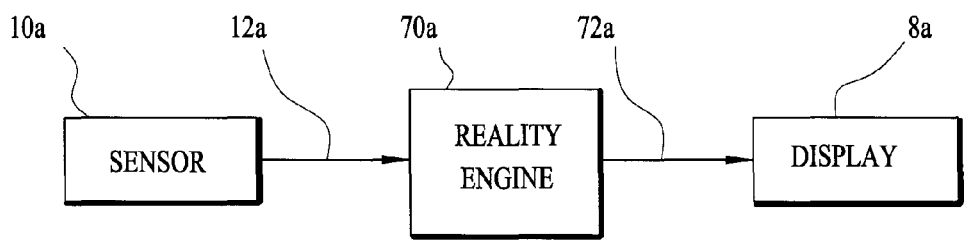
FIG. 9 shows hardware setup for active use of the moveable headrest, i.e., with the user moving his head at will.
Figure 10:
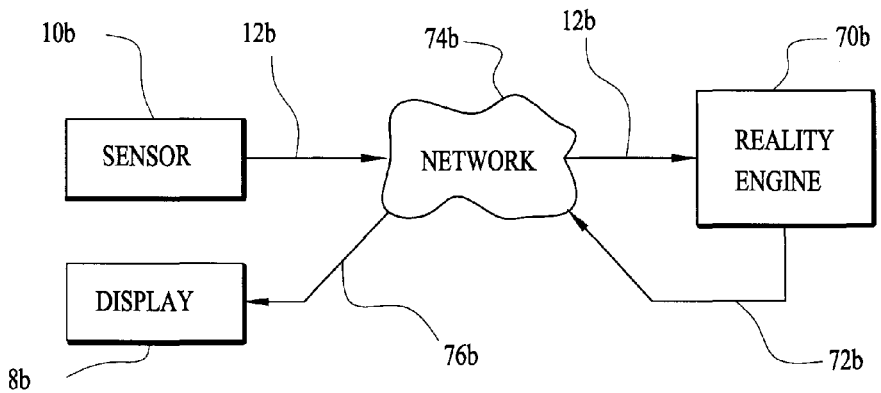
FIG. 10 is the same as FIG. 9 except that the reality engine 70b is remote and is accessed via a network 74b.

FIG. 9 shows hardware setup for active use of the moveable headrest, i.e., with the user moving his head at will. A sensor 10a provides a sensed signal on a line 12a to a local reality engine 70a which, in response thereto, retrieves an image sequence from a memory therein having a plurality of such stored sequences. The signal on the line 12a is comparable to the signal on the line 28 of FIG. 3 of U.S. Pat. No. 5,644,324. The retrieved sequence is provided on a line 72a to a display 8a for viewing by the active user. The reality engine 8a may be embodied in a local computer or a remote computer accessible through a network 74b, as shown in FIG. 10. In the example of FIG. 9, the active user moves his head and the headrest follows. The sensor 10a senses the angular rotation of the headrest and provides the sensed signal on the line 12a to the reality engine 70a which in turn provides the retrieved sequence on the line 72a to the display 8a. The retrieved sequence of images are taken from different directions of view, corresponding to the viewer's active head movements. The images are presented from differing directions of view according to the active user's head movements to make him feel that he is moving his head and viewing the virtual world in the same way he views the real world. FIG. 10 is the same as FIG. 9 except that the reality engine 70b is remote and is accessed via a network 74b. The reference numerals are similar to those of FIG. 9 except with the "b" suffix.

Figure 11:
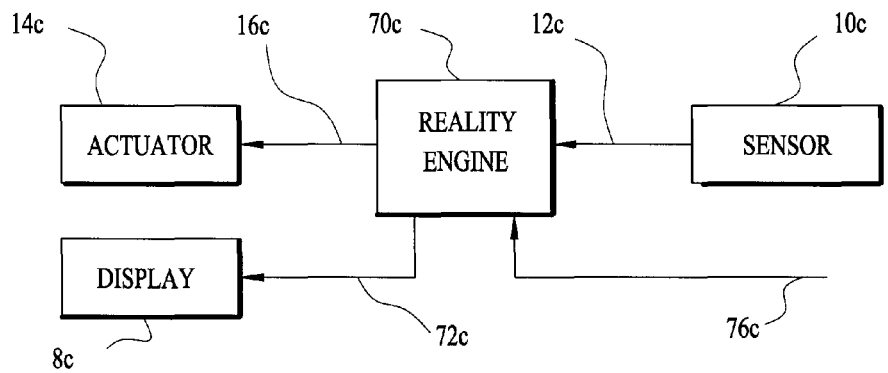
FIG. 11 shows passive use of the moveable headrest with an actuator 14c moving the headrest and hence the user's head in response to a signal on a line 16c from a local reality engine 70c.
Figure 12:
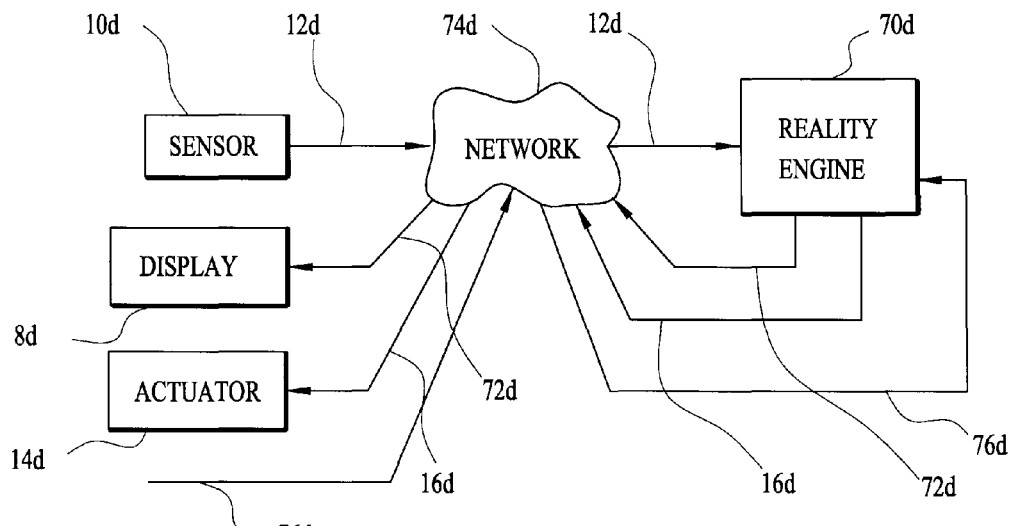
FIG. 12 is the same as FIG. 11 except the reality engine is remote.

FIG. 11 shows passive use of the moveable headrest with an actuator 14c moving the headrest and hence the user's head in response to a signal on a line 16c from a local reality engine 70c. The signal on the line 16c is comparable to the signal on the line 20 of FIG. 1 of U.S. Pat. No. 5,734,421. The sensor 10c provides the sensed signal on the line 12c to the local reality engine 70c as a feedback signal, for closed loop control. For a headrest that is only to be used for passive users, it should be realized that a sensor is not absolutely necessary since open loop control of the headrest will work. In the case of passive use, the reality engine retrieves a single, pre-planned image sequence from a memory therein, in response to a start command signal on a line 76c. The start command signal on the line 76c can originate with the passive viewer pressing a button, voicing a speech command, having his eyes monitored, by some combination of such commands, or the like. The retrieved sequence is provided on a line 72c to a display 8c for viewing by the passive user. The reality engine 70c may be embodied in a local computer or a remote computer accessible through the network 74d, as shown in FIG. 12. FIG. 12 is the same as FIG. 11 except the reality engine is remote and accessed via a network 74d. The reference numerals in FIG. 12 are similar to those of FIG. 11 except having the suffix "d".

Although the invention has been shown and described with respect to particular embodiments thereof, various other changes, omissions, and additions in the form and detail thereof may be made therein without departing from the spirit and scope of the invention.

I claim:

1. Apparatus, comprising:
    a support for supporting a body of a user in viewing images;
    a moveable headrest mounted on said support for moving with rotational movements including at least yaw movements with respect to the support and for supporting a head of the user in executing corresponding rotational movements including at least yaw movements with respect to the body of the user while supported by said support and while viewing the images provided from correspondingly changing directions; and
    a display for providing the images from the correspondingly changing directions for the viewing by the head of the user from the changing directions in said executing corresponding rotational movements,
    an actuator, responsive to a headrest control signal, for causing the moveable headrest to execute the rotational movements with respect to the support including at least yaw movements to guide the head of the user to execute the corresponding rotational movements including at least yaw movements in acting as a passive viewer of the images.

2. The apparatus of claim 1, wherein the support itself is continuously positionable.

3. The apparatus of claim 1, further comprising a sensor for sensing movements from a changing direction and providing a sensed signal having a magnitude indicative thereof.

* * * * *